US007902767B2

(12) United States Patent
Tong et al.

(10) Patent No.: US 7,902,767 B2
(45) Date of Patent: Mar. 8, 2011

(54) AC INVERTER CAPABLE OF DRIVING MULTIPLE LAMPS FOR LCD PANEL BACKLIGHT

(75) Inventors: Hing S. Tong, Santa Fe Springs, CA (US); Shikuang Tan, Santa Fe Springs, CA (US)

(73) Assignee: Westinghouse Digital, LLC, Orange, CA (US)

( * ) Notice: Subject to any disclaimer, the term of this patent is extended or adjusted under 35 U.S.C. 154(b) by 918 days.

(21) Appl. No.: 11/757,949

(22) Filed: Jun. 4, 2007

(65) Prior Publication Data
US 2008/0157685 A1 Jul. 3, 2008

Related U.S. Application Data

(60) Provisional application No. 60/882,791, filed on Dec. 29, 2006.

(51) Int. Cl.
*H05B 41/16* (2006.01)

(52) U.S. Cl. ......... 315/282; 315/307; 315/224; 315/324; 315/276; 363/21.09; 363/21.15; 363/34; 307/23; 307/36

(58) Field of Classification Search .......... 315/86, 315/246, 224, 272, 276, 209 R, 282, 307, 315/312, 324; 363/16, 17, 21.06, 21.09, 363/21.15, 34, 98; 307/23, 29, 33, 36, 43
See application file for complete search history.

(56) References Cited

U.S. PATENT DOCUMENTS

| 4,727,291 | A * | 2/1988 | Bavaro .................. 315/86 |
| 5,175,441 | A * | 12/1992 | den Hollander .......... 307/43 |
| 6,188,584 | B1 * | 2/2001 | Arai et al. .................. 363/16 |
| 6,414,447 | B1 * | 7/2002 | Kitamura et al. ............. 315/272 |
| 6,936,975 | B2 * | 8/2005 | Lin et al. ................... 315/224 |
| 7,250,731 | B2 * | 7/2007 | Jin ......................... 315/282 |

FOREIGN PATENT DOCUMENTS

WO PCT/US2004/021657 A2 1/2005

OTHER PUBLICATIONS

Optoware Electronics, Green Power System, The accelerator of LCD TV Market, Powerpoint Presentation, May 2006, Optoware Electronics, U.S.
Samsung Electronics Co., Ltd., 40" FFL IP Design Status, Powerpoint Presentation, Dec. 19, 2006, Samsung Electronics Co., Ltd., Taiwan.
Balancer Application Note, Author Unknown, Date prior to Dec. 26, 2006.
LCD SMPS For Displace, Powerpoint Presentation, Samsung Electronics P & M. Division, Date prior to Dec. 26, 2006, Samsung Electronics Co., Ltd., Taiwan.
AC Inverter, Samsung Digital, Powerpoint Presentation, May 4, 2005, Samsung Electronics Co., Ltd., Taiwan.

* cited by examiner

*Primary Examiner* — Haissa Philogene
(74) *Attorney, Agent, or Firm* — Renner, Otto, Boisselle & Sklar, LLP

(57) ABSTRACT

An AC inverter circuit supplies power to multiple lamps in an LCD backlight. Conventional AC power is used as direct input into a full wave rectifier that converts the input from AC to a DC reference voltage. A transformer driver, including a chopper, converts the DC reference voltage to a higher voltage AC which drives a step up transformer to produce a voltage sufficient to drive as many as six fluorescent lamps. The components/circuitry associated with the transformer's primary windings is optically isolated from the rest of the circuit.

29 Claims, 2 Drawing Sheets

*AC multiple lamps backlight unit*

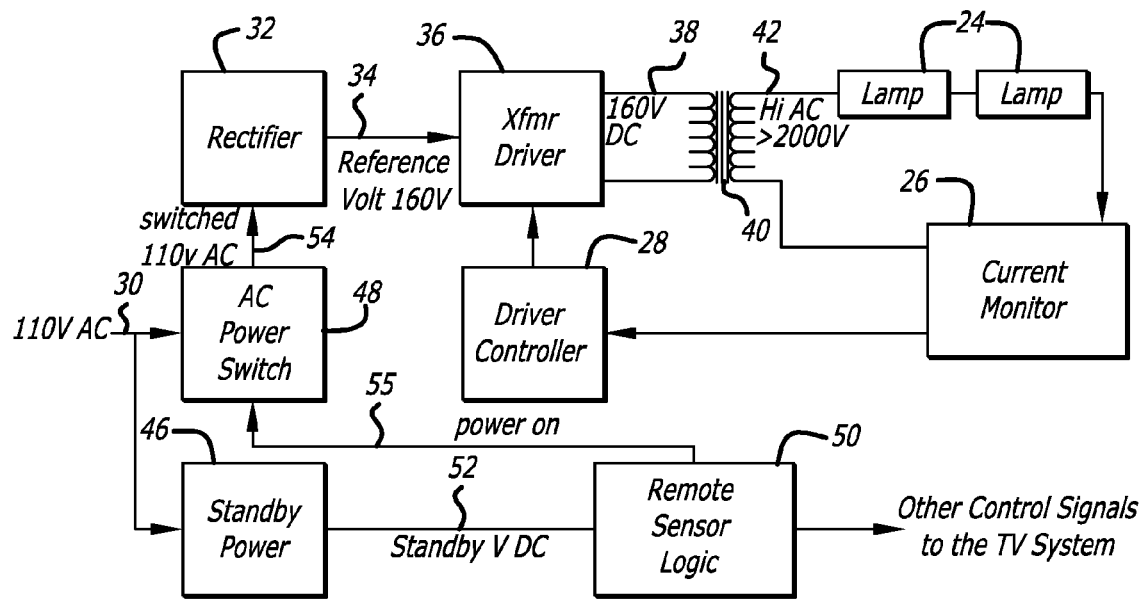
FIG. 3 AC multiple lamps backlight unit with standby power
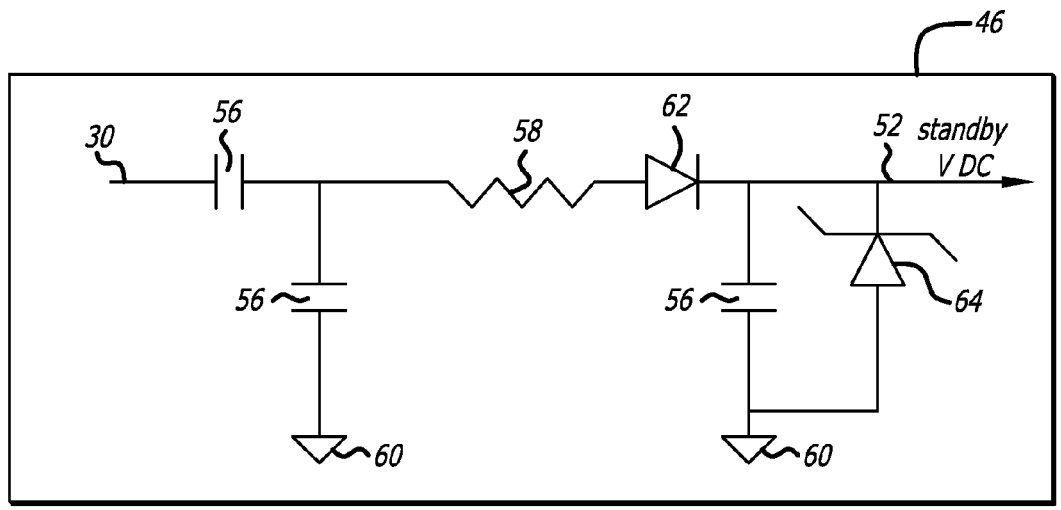
FIG. 4 Standby Power Supply

AC INVERTER CAPABLE OF DRIVING MULTIPLE LAMPS FOR LCD PANEL BACKLIGHT

CROSS-REFERENCE TO RELATED APPLICATIONS

This application is a continuation-in-part of provisional application No. 60/882,791 filed Dec. 29, 2006 and entitled "AC Inverter Capable of Driving Multiple Lamps for LCD Panel." Priority is claimed on the basis of that application and it is incorporated herein by reference.

BACKGROUND

1. Field of the Invention

The present invention relates to LCD displays. Specifically, the invention relates to using a single inverter to drive multiple lamps in an LCD panel backlight.

2. Description of the Related Art

Liquid Crystal Displays (LCD) utilize liquid crystal molecules to form pixels of a display. Electrical charges on a liquid crystal cause it to align in a helical structure. The amount of electricity required is low and the technology is commonly utilized in display panels because of the low energy requirement and compact size.

The liquid crystals are not self-illuminating and light must be projected onto them from an external light source. The LCD then acts to polarize light and uses polarization to "shutter" light to create dark images and to allow light to pass through for bright objects. In color LCDs, the polarization is used similarly on multiple red, green and blue pixels to create any one of millions of colors. The common light source for a display panel is a backlight. The backlight consumes much more energy then the LCD and is typically a series of lamps mounted on the LCD's back panel. These lamps are typically cold cathode fluorescent lamps (CCFL).

Conventional circuit designs for LCD backlight displays use a low power direct current (DC) power supply to power the lamp or lamps that illuminate the LCD. The current from the low power DC power supply is converted to higher voltage alternating current (AC). The industry standard specification of the lamps used in LCD panel backlights require high voltages to start up the lamps and keep the lamps on. As a result, despite being converted to high voltage AC, the higher voltage may be only sufficient to power a single lamp. That means each lamp in a group of lamps (typically more than one is required in most modern LCD panels) must have its own inverter associated with it.

The backlight unit constitutes a significant portion of the overall manufacturing cost of an LCD panel display. Part of the high manufacturing cost of the backlight units is due to the fact that each lamp requires its own inverter. With small panel displays, manufacturing costs are not as affected by the requirement that each lamp have its own inverter because of the relatively low number of lamps and associated inverters required. However, with large panel displays that require 20-40 lamps, the requirement that each lamp have its own inverter constitutes a large portion of the backlight's manufacturing cost.

Other consequences of having a large number of inverters in the backlight includes: decreased energy efficiency, decreased reliability and variations in illumination uniformity.

Therefore, there is a need for a way to power multiple lamps from a single inverter. Such a device would drastically lower the number of inverters required, which will make the manufacture of large screen LCD panels substantially more cost effective. Also, with fewer total inverters in the overall system, energy efficiency is increased, reliability is increased and illumination uniformity is easier to control.

SUMMARY OF THE INVENTION

The present invention represents a different approach to powering the lamps in an LCD panel display's backlight, particularly large panel displays. Large panel displays typically have between 20-40 lamps. Using prior art AC inverters, such as the one illustrated in FIG. 1, each AC inverter can only illuminate one lamp, resulting in an equal number of lamps and inverters. The requirement of having an equal number of lamps and AC inverters contributes to the high manufacturing cost of the backlight of an LCD panel display. In addition, because of the large number of AC inverters, the system is not energy efficient, unreliable and may have a large degree of variation in illumination from lamp to lamp.

Accordingly, the present invention has been made to overcome the limitation of each AC inverter only able to illuminate a single lamp. It is a further objective of the invention to make manufacture of large size LCD panels more cost effective, while maintaining high energy efficiency, reliable startup, reliable protection and tight control of lamp current for illumination uniformity.

The aforementioned objectives are achieved by using a full wave rectifier instead of a low voltage DC power supply that is in prior art AC inverters. By using a full wave rectifier, significantly more power enters the circuit. With significantly more power entering the circuit, up to 5-6 lamps may be powered by a single AC inverter. This overcomes the one to one ratio of inverters to lamps of the prior art.

Since the AC inverter described in the specification can power 5-6 lamps per AC inverter, significantly fewer AC inverters are required in large panel displays. For example, in a large LCD panel display with 40 lamps, 40 AC inverters would be required to power all 40 lamps under the prior art. However, using the AC inverter described in the accompanying figures and description of the figures, only 7-8 inverters would be needed.

The significantly lower number of AC inverters required for illumination of the LCD panel will result in a decrease in manufacturing costs of the LCD back panel, which already constitutes a significant portion of an LCD's manufacturing cost. The reduction can be as must as an 80% reduction in the cost of manufacture. The most obvious reason for the decrease in manufacturing costs of the LCD back panel is the reduction in the total number of circuits because one circuit can drive multiple lamps. Other factors that will contribute to the decrease in manufacturing costs include smaller printed circuit boards and fewer components. The decrease in the manufacturing cost of the LCD back panel will drive an overall decrease in the manufacturing cost of the unit. Also, the fewer inverters in the system enhance energy efficiency, increase reliability and increase illumination uniformity.

The preferred embodiment is directed to large panel LCD displays, which require 20-40 lamps. However, this invention has uses in all LCD panel displays because increasing energy efficiency, reliability and illumination uniformity is always beneficial. Furthermore, an additional embodiment of the invention also includes the use of a standby power supply. The standby power supply permits an associated device, such as a television set, to be put in a "sleep" state for easy "waking."

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 3 is a block diagram of an LCD backlight AC inverter circuit according to an alternative embodiment of the present invention; and FIG. 4 is a circuit diagram of a standby power supply in the circuit of FIG. 3.

DETAILED DESCRIPTION OF THE INVENTION

Figure 1:
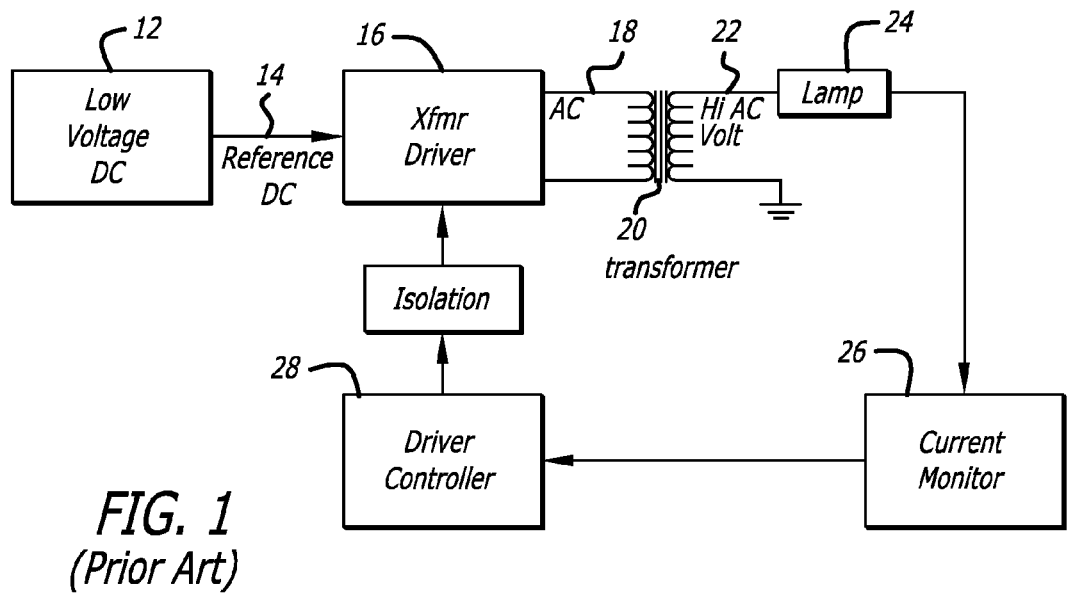
FIG. 1 is a block diagram of a prior art LCD backlight AC inverter circuit.

First turning to FIG. 1, there is a circuit diagram of the prior art typical backlight unit. As shown, a low voltage DC power supply 12 sends low voltage reference direct current (DC) 14 into the transformer driver 16. The transformer driver 16 converts the low voltage reference DC 14 into an alternating current (AC) voltage 18 The AC voltage 18 drives a transformer 20. The transformer 20 converts the AC voltage 18 into high voltage AC 22 sufficient to power a single CCFL 24. Current monitor 26 monitors the current going through the lamp to detect an open or short circuit condition. The driver controller 28 receives a feedback signal input from the current monitor 26.

Figure 2:
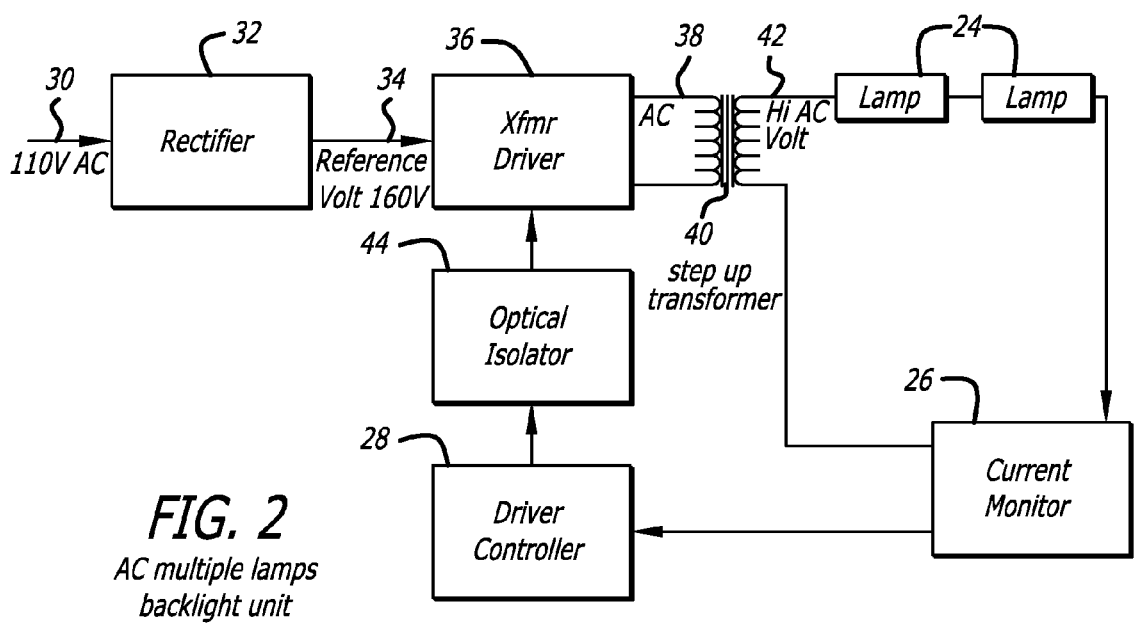
FIG. 2 is a block diagram of an LCD backlight AC inverter circuit according to the present invention.

Turning next to FIG. 2, there is shown a circuit diagram of an AC power supply that may be used to power multiple lamps in an LCD panel display. Power is supplied from a 110V AC source 30, typically an available power outlet. A full wave rectifier 32 steps the voltage up to 160 volts and converts it to a DC voltage. The illustrated embodiment is not intended to limit the direct input AC voltage 30 to 110V. Rather, 110V is chosen because it is the standard voltage found in the United States and several other countries. Those skilled in the art will be able to adapt the invention to be utilized with different worldwide voltage standards such as 220-240V found throughout Europe.

The full wave rectifier 32 is used in place of the low voltage DC power supply 12 used in conventional circuit designs exemplified by the circuit of FIG. 1. The use of the full wave rectifier 32 permits use of a higher AC voltage 30 instead of low voltage, reference DC 14. Because the full wave rectifier 32 uses AC standard voltage 30, a significantly higher voltage may be applied to the lamp circuits then the system of the prior art.

The full wave rectifier 32 converts the direct input AC voltage 30 into a substantially higher reference DC voltage 34. In the illustrated embodiment, the reference voltage 24 is clamped at about 160V to minimize ripple effect. Ultimately, the voltage output used is dependent on a variety of factors including the input voltage applied to the full wave rectifier 32 which converts AC to DC. The reference voltage 34 is applied to a transformer driver 36 which converts the higher voltage DC back to AC voltage 38 to power the high voltage transformer 40 which then can power multiple lamps 24, two of which are shown by way of an example.

It may seem more convenient to input the 110V AC directly into the step up transformer 40 instead of converting to DC and then reconverting to AC. However, connecting the 110 V AC directly to the step up transformer 40 is inefficient because in the United States, the frequency of the standard electrical current is set at 60 Hz. This frequency is too low to drive the step up transformer 40 efficiently. Those skilled in the art will be able to adapt this invention for use in other countries where the frequency is not 60 Hz. This invention may be used, for example, in Europe, where the standard frequency for electrical currents is 50 Hz.

A high frequency chopper can increase the AC frequency as it converts DC to AC. A high frequency chopper works by interrupting, or chopping, the flow of DC at regular intervals, resulting in pulses that simulate the sine waves of AC. Because the high frequency chopper requires a source of DC to convert into high frequency AC, the rectifier 32 is needed to convert the 110V AC 30 into a higher voltage DC. The high frequency chopper can then convert the DC into high frequency AC.

The current coming from a full wave rectifier has constant polarity so the waves are either all positive or all negative. In contrast, AC takes the shape of a sine wave, with alternating positive and negative polarity. The chopper works by interrupting the flow of DC at regular intervals. As a result, the chopper does not actually convert DC into true AC, but rather, pulses of either positive or negative DC. Since the DC is pulsed at regular intervals, it simulates the sine waves of AC.

In the illustrated embodiment, the transformer driver 36 acts as a high frequency chopper, to increase the AC frequency as the reference voltage 34 is converted into input AC voltage 38. The transformer driver 36 increases the frequency from the standard 60 Hz to 100 KHz, which is a more efficient frequency to drive the step up transformer 40 than 60 Hz. For safety reasons, the components/circuitry associated with the primary winding of the transformer 40, where the AC 38 is connected, is optically isolated from the rest of the circuit. This is achieved through the use of an optical isolator 44.

The high AC voltage 42 coming from the step-up transformer 40 is at least 2000V, which is applied to energize the serially connected lamps 24. Although the illustrated embodiment of the invention only shows two lamps 24 wired in the circuit, additional lamps may be lit using this invention. In the preferred embodiment, up to 6 lamps may be driven using this invention. With the additional power supplied by full wave rectifier 32 and amplified by step-up transformer 40 to more than 2000 V, this circuit may illuminate up to six serially connected lamps 24. The lamps 24 used are the standard CCFLs found in the prior art and the specifications are well known to those skilled in the art.

The CCFLs 24 are wired in series so the same current will be running through all of the lamps 24. Furthermore, it is easier to control luminance throughout the entire backlight system when only a few inverters control all the lamps 24 as opposed to a system with several lamps 24, each with its own inverter. If the situation were to arise where one or more lamps 24 on the circuit were to be non-functioning, none of the lamps 24 wired on the same circuit will illuminate. The current monitor 26 in conjunction with the driver controller 28 detects non-functioning lamps 24 and can disable the system.

Current monitor 26 detects the current flowing through the lamps 24 and feeds back a signal to driver controller 28. Driver controller 28 will shut off the transformer driver 36 in the event that the current monitor 26 detects a short or open circuit in the lamps 24. As a result, if one of the lamps 24 is defective, none of the other lamps 24 on the circuit will illuminate because the transformer driver 36 has been prevented from operating.

Turning next to FIG. 3, there is shown a similar circuit diagram as shown in FIG. 2, but with the inclusion of an additional circuit that features a standby power source 46. The direct input AC 30 goes into either the standby power source 46 or an AC power switch 48 rather than to the full wave rectifier 32. The AC power switch 48 is controlled by a remote sensor logic unit 50. The remote sensor logic unit 50 is commanded by control signals from TV system, and outputs a power on signal 55 that can drive the AC power switch. The AC power switch 48 should be in the closed position until the power on signal 55 opens it. In this embodiment, direct input AC 30 is still 110V AC, which is the standard voltage in the United States and many other parts of the world. However, those skilled in the art will be able to adapt the invention to be utilized with different voltages standards worldwide.

In the standby power source 46, the AC current 30 is converted to standby Vdc 52. The standby Vdc 52 then goes into the remote sensor logic 50. The standby Vdc 52 is rated at 5 V and is used to keep the remote sensor logic 50 operating while the main system power is off. The remote sensor logic 50 receives signals from a remote control. The process of how remote sensor logic 50 receives, processes and reacts to signals from a remote control is well known in the art and as a result, will not be discussed in the instant specification.

When the remote sensor logic 50 receives a signal from the remote control instructing the lamps 24 to turn on, it sends a power on signal 55 to the AC power switch 48. After receiving the power on signal 55 from the remote sensor logic 50 the AC power switch 48 switches to the open position and direct input AC 30 can flow through it. The AC leaving the AC power switch 48 is switched AC 54. The switched AC 54 goes to the rectifier 32 and enters the process illustrated and described by FIG. 2. Remote sensor logic 50 is capable of receiving other control signals and is not just limited to turning lamps on, but its other uses are not within the scope of this invention and therefore will not be described.

Finally turning to FIG. 4, a more detailed diagram of how the standby power supply 46 converts direct input AC 30 to standby Vdc 52 is shown. The circuit diagram shown in FIG. 4 is the preferred embodiment of the standby power supply 46 to be used with the instant invention. FIG. 4 is representative of one of several ways in which AC current 30 is converted to standby Vdc 52. Those skilled in the art will recognize that there are other means of making the conversion.

When the AC current 30 enters the standby power supply 46, it goes through a series of capacitors 56 and resistors 58 to convert the current from direct input AC 30 to standby Vdc 52. Because the voltage on standby Vdc is only 5V, any excess current is shifted to the signal grounds 60. The diode 62 ensures that the current only flows in one direction. The zener diode 64 permits excess current to flow towards a signal ground 60.

The equipment to implement the present invention is currently available from existing, off the shelf components. Because of the adjusted current that is used, some components may require slight modifications to take into account the adjusted current. Any modifications that must be made are well known to those skilled in the art, and as such, will not be discussed in the present specification. Accordingly, the scope of the invention should not be limited to the illustrated application but can be extended to other environments with appropriate modifications of the equipment.

What is claimed is:

1. An AC inverter circuit that supplies power to at least two lamps in an LCD backlight, in combination with the multiple lamps of the LCD backlight, the combination comprising:
   (a) a full wave rectifier, for converting direct input AC current into a reference voltage;
   (b) a transformer driver, wired to said full wave rectifier, that converts said reference voltage into an AC current;
   (c) a step up transformer, wired to said transformer driver, for increasing the voltage of said AC current to a high voltage AC current; and
   (d) the at least two lamps, serially wired to said step up transformer, that are actuated by said high voltage AC current;
   wherein the transformer driver acts as a high frequency chopper.

2. The combination of claim 1 further comprising an optical isolator, connected to said transformer driver, to isolate components/circuitry associated with a primary winding of a transformer that is coupled to the transformer driver, for safety purposes.

3. The combination of claim 1 further comprising a source of AC power, connected to said full wave rectifier, for generating direct input AC.

4. The combination of claim 3 wherein the voltage of said direct input AC current is 110.

5. The combination of claim 3 wherein the voltage of said direct input AC current is 220.

6. The combination of claim 1 wherein said high voltage AC current is at least equivalent to the voltage required to activate one lamp, multiplied by the total number of lamps (the at least two lamps) that are wired in series.

7. The combination of claim 1, as part of a liquid crystal display (LCD).

8. The combination of claim 1, wherein the high frequency chopper increases the AC frequency of the reference voltage.

9. The combination of claim 8, wherein the high frequency chopper increases the AC frequency of the reference voltage from 60 Hz to 100 KHz.

10. The combination of claim 1, wherein the lamps are cold cathode fluorescent lamps (CCFL).

11. A circuit that supplies standby power to a full wave rectifier, comprising:
   (a) a source of AC power generating an AC current;
   (b) a standby power supply, connected to said source of AC power, for converting said AC current into a standby Vdc current;
   (c) a remote sensor logic, connected to said standby power supply, to receive said standby Vdc;
   (d) an AC power switch, connected to said remote sensor logic and said source of AC power, wherein said remote sensor logic receives signals from a remote source and generates a "power on" signal that is sent to said AC power switch, which upon reception of said "power on" signal, sends a switched voltage to the full wave rectifier.

12. The circuit of claim 11, in combination with the full wave rectifier.

13. The combination of claim 12, further comprising:
   additional circuit elements coupled to the rectifier; and
   at least two lamps that are part of an LCD backlight;
   wherein the additional circuit elements are used to power the at least two lamps.

14. The combination of claim 13, wherein the lamps are cold cathode fluorescent lamps (CCFL).

15. The combination of claim 13, wherein the additional circuit elements include:
   a transformer driver, wired to the full wave rectifier, that converts the reference voltage into an AC current; and
   a step up transformer, wired to the transformer driver, for increasing the voltage of the AC current to a high voltage AC current.

16. A system that converts AC voltage to appropriate power levels for driving multiple serially connected lamps, comprising:
- (a) a full wave rectifier;
- (b) at least two lamps, wired in series, connected to said full wave rectifier; and
- (c) a transformer driver that acts as a high frequency chopper, connected between the full wave rectifier and the at least two lamps.

17. A liquid crystal display (LCD) device comprising:

a backlight that includes at least two cold cathode fluorescent lamps (CCFL); and a circuit that supplies power to the at least two lamps, wherein the circuit includes:
- a full wave rectifier, for converting direct input AC current into a reference voltage;
- a transformer driver, wired to the full wave rectifier, that converts the reference voltage into an AC current; and
- a step up transformer, wired to the transformer driver, for increasing the voltage of said AC current to a high voltage AC current;

wherein the at least two lamps are serially wired to the step up transformer, and are actuated by said high voltage AC current.

18. The device of claim 17, wherein the transformer driver acts as a high frequency chopper.

19. The device of claim 18, wherein the high frequency chopper increases the AC frequency of the reference voltage.

20. The device of claim 19, wherein the high frequency chopper increases the AC frequency of the reference voltage from 60 Hz to 100 KHz.

21. A circuit that controls illumination of lamps illuminating a flat panel display, in combination with at least two of the lamps, the combination comprising:
- (a) said at least two lamps, connected in series;
- (b) a current monitor, connected to said at least two lamps, for detecting the current flowing through said series;
- (c) a driver controller, connected to said current monitor, for receiving feedback from said current monitor; and
- (d) a transformer controller, connected to said driver controller, for controlling a transformer.

22. The combination of claim 21 wherein said driver controller prevents operation of said transformer controller when said current monitor detects a short circuit in said lamps.

23. The combination of claim 21, as part of a flat panel display.

24. The combination of claim 21, wherein the transformer driver acts as a high frequency chopper.

25. The combination of claim 24, wherein the high frequency chopper increases the AC frequency of the reference voltage.

26. The combination of claim 25, wherein the high frequency chopper increases the AC frequency of the reference voltage from 60 Hz to 100 KHz.

27. The combination of claim 21, wherein the lamps are cold cathode fluorescent lamps (CCFL).

28. The combination of claim 21 wherein said driver controller prevents operation of said transformer controller when said current monitor detects an open circuit in said lamps.

29. The combination of claim 21 wherein said driver controller adjusts the light output of said lamps, based upon a control signal.

* * * * *